United States Patent
Yahata (10) Patent No.: US 9,518,628 B2
(45) Date of Patent: Dec. 13, 2016

(54) TUBULAR VIBRATION-DAMPING DEVICE

(71) Applicant: SUMITOMO RIKO COMPANY LIMITED, Komaki-shi, Aichi (JP)

(72) Inventor: Yuki Yahata, Komaki (JP)

(73) Assignee: SUMITOMO RIKO COMPANY LIMITED, Komaki-shi (JP)

(*) Notice: Subject to any disclaimer, the term of this patent is extended or adjusted under 35 U.S.C. 154(b) by 0 days.

(21) Appl. No.: 14/805,839

(22) Filed: Jul. 22, 2015

(65) Prior Publication Data
US 2015/0323029 A1 Nov. 12, 2015

Related U.S. Application Data

(63) Continuation of application No. PCT/JP2014/072956, filed on Sep. 1, 2014.

(30) Foreign Application Priority Data

Sep. 24, 2013 (JP) ................ 2013-196766

(51) Int. Cl.
*F16F 1/14* (2006.01)
*F16F 1/38* (2006.01)
(Continued)

(52) U.S. Cl.
CPC ............ *F16F 1/38* (2013.01); *B60G 7/006* (2013.01); *B60G 11/22* (2013.01); *F16F 1/3814* (2013.01);
(Continued)

(58) Field of Classification Search
CPC ........ F16F 1/371; F16F 1/3735; F16F 1/3863; B60G 7/00; B60G 7/02; B62D 24/02
(Continued)

(56) References Cited

U.S. PATENT DOCUMENTS 4,744,677 A * 5/1988 Tanaka ............... F16F 1/371
267/141
5,062,654 A * 11/1991 Kakimoto ............ B60G 7/02
267/141
(Continued)

FOREIGN PATENT DOCUMENTS

JP S62-40344 U 3/1987
JP H05-77637 U 10/1993
(Continued)

OTHER PUBLICATIONS

Oct. 7, 2014 Search Report issued in International Patent Application No. PCT/JP2014/072956.

*Primary Examiner* — Christopher Schwartz
(74) *Attorney, Agent, or Firm* — Oliff PLC (57) ABSTRACT

A tubular vibration-damping device including: an inner shaft member; an outer tube member; and a main rubber elastic body which couples the two members. The outer tube member is made of synthetic resin and integrally includes on its first axial end a locking part having a locking projection on its outer circumference surface and a stopper support part that supports a base end part of a stopper rubber projecting axially outward therefrom. The locking part is positioned at an outer circumference side of the stopper support part across a recess that opens axially outward of the outer tube member. Deformation of the locking part to an inner circumference side is restricted by the stopper rubber swelling to the outer circumference side along with its compressive deformation in an axial direction and abutting against an inner circumference surface of the locking part.

6 Claims, 4 Drawing Sheets

(51) Int. Cl.
*B60G 11/22* (2006.01)
*B60G 7/00* (2006.01)

(52) U.S. Cl.
CPC ........... *F16F 1/3828* (2013.01); *F16F 1/3842* (2013.01); *B60G 2204/41* (2013.01); *F16F 2224/02* (2013.01); *F16F 2230/0005* (2013.01)

(58) Field of Classification Search
USPC ...... 267/140.2–140.5, 141.1–141.7; 248/638
See application file for complete search history.

(56) References Cited

U.S. PATENT DOCUMENTS

| | | | | |
|---|---|---|---|---|
| 5,286,014 | A * | 2/1994 | Chakko | B60G 7/00 267/141.2 |
| 5,799,930 | A * | 9/1998 | Willett | B62D 24/02 267/141.4 |
| 2006/0202101 | A1 * | 9/2006 | Dickson | F16F 1/3735 248/638 |
| 2012/0049425 | A1 * | 3/2012 | Willis | H05K 7/142 267/141 |
| 2015/0323031 | A1 * | 11/2015 | Yahata | F16F 1/3863 267/141.2 |

FOREIGN PATENT DOCUMENTS

| | | |
|---|---|---|
| JP | H06-129461 A | 5/1994 |
| JP | H08-177917 A | 7/1996 |

* cited by examiner

TUBULAR VIBRATION-DAMPING DEVICE

INCORPORATED BY REFERENCE

The disclosure of Japanese Patent Application No. 2013-196766 filed on Sep. 24, 2013, including the specification, drawings and abstract is incorporated herein by reference in its entirety. This is a Continuation of International Application No. PCT/JP2014/072956 filed on Sep. 1, 2014.

BACKGROUND OF THE INVENTION

1. Field of the Invention

The present invention relates to a tubular vibration-damping device that is suitably used as a member mount that is mounted on an attachment part or the like of a subframe or suspension member in relation to a main body of a vehicle, a vibration damping bush mounted to an attachment part or the like at a vehicle body side of a suspension member constituting a vehicle suspension mechanism, or the like.

2. Description of the Related Art

From the past, as one type of vibration-damping device, a tubular vibration-damping device for which an inner shaft member and an outer tube member are coupled by a main rubber elastic body has been known. In specific terms, a tubular vibration-damping device is shown in Japanese Unexamined Patent Publication No. JP-A-6-129461, Japanese Unexamined Utility Model Publication No. JP-U-5-077637 and the like. Also, with this kind of tubular vibration-damping device, for example, while an outer tube member is press-fitted and fixed to a mounting hole provided on an automobile suspension member, by fixing an inner shaft member to the main body, this is used to do vibration-damping support of the suspension member on the main body.

However, with the tubular vibration-damping device as described above, for reasons such as making it lighter, reducing manufacturing costs and the like, it has been attempted to use outer tube members made of synthetic resin rather than outer tube members made of metal.

However, with the outer tube member made of synthetic resin, because of permanent set-in fatigue due to heat or changes over time, it was difficult to obtain stable press fitting fixing force on the mounting hole over a long time, and it was difficult to ensure sufficient pull-out resistance force in the axial direction.

As shown in JP-A-6-129461 and JP-U-5-077637 noted above, to ensure pull-out resistance force in the axial direction with the outer tube member made of synthetic resin, a constitution has also been proposed for which a locking projection provided on an outer circumference surface of the outer tube member is locked on the end surface of the mounting hole. However, when an attempt is made to enlarge the projection height of the locking projection to increase the pull-out resistance force, there are cases where the locking projection becomes an obstacle when inserting the outer tube member in the mounting hole to mount it, and it was difficult to obtain sufficient pull-out resistance force with the locking projection.

In particular, when a stopper rubber is provided projecting in the axial direction, and a load in the axial direction is applied via the stopper rubber in the direction for which the outer tube member can fall out from the mounting hole, it is even more difficult to ensure pull-out resistance force of the outer tube member from the mounting hole.

SUMMARY OF THE INVENTION

The present invention has been developed in view of the above-described matters as the background, and it is an object of the present invention to provide a tubular vibration-damping device with a novel structure which is able to achieve making the outer tube member out of synthetic resin while ensuring sufficient pull-out resistance force of the outer tube member from the mounting hole.

A first mode of the present invention provides a tubular vibration-damping device comprising: an inner shaft member; an outer tube member; and a main rubber elastic body coupling the inner shaft member and the outer tube member, wherein the outer tube member is made of synthetic resin, the outer tube member integrally includes on its first axial end a locking part having a locking projection on its outer circumference surface and a stopper support part that supports a base end part of a stopper rubber projecting axially outward therefrom, the locking part is positioned at an outer circumference side of the stopper support part across a recess that opens axially outward of the outer tube member, and deformation of the locking part to an inner circumference side is restricted by the stopper rubber swelling to the outer circumference side along with its compressive deformation in an axial direction and abutting against an inner circumference surface of the locking part.

With the tubular vibration-damping device constituted according to this mode, in a state mounted in a mounting hole of a suspension member or the like, by the locking projection of the locking part being locked to the opening end surface of the mounting hole or the like, falling out of the outer tube member from the mounting hole is prevented. In fact, when a large load in the axial direction is applied via the stopper rubber in the direction for which the outer tube member falls out from the mounting hole, by skillfully using bulging deformation of the stopper rubber to the outer circumference side and restricting deformation of the locking part to the inner circumference side, the locked state of the locking projection to the opening end surface of the mounting hole or the like is effectively maintained, and pull-out resistance force from the mounting hole can be effectively exhibited.

In particular, since a recess is provided between the locking part and the stopper support part, when the outer tube member is inserted in the mounting hole for mounting, elastic deformation of the locking part into the recess is easily allowed, and it is possible to easily do work with a small resistance force. Meanwhile, in a state with the outer tube member mounted in the mounting hole, by doing elastic deformation of the stopper rubber in the direction of getting into the recess by the load in the axial direction, the outer circumference surface of the stopper rubber swollen to the outer circumference side is easily abutted and positioned on the inner circumference surface of the locking part, and the deformation rigidity of the stopper rubber to the inner circumference side is also ensured to be large by the stopper support part, and blocking power for deformation and displacement of the locking part to the inner circumference side can be effectively exhibited.

A second mode of the present invention provides the tubular vibration-damping device according to the first mode, wherein an outer circumference surface of the stopper support part is an inclined surface gradually expanding to the outer circumference side from a tip end side to a base end side in the axial direction.

With the tubular vibration-damping device of this mode, when a load in the axial direction is applied to the stopper rubber in a mounted state, the stopper rubber which is elastically deformed so as to enter into the recess undergoes more efficient bulging deformation to the outer circumference side by the guiding action of the inclined surface. As a result, the restriction against deformation to the inner circumference side of the locking part by the stopper rubber swollen to the outer circumference side can be even more effectively exhibited.

A third mode of the present invention provides the tubular vibration-damping device according to the first or second mode, wherein at a bottom part of the recess, an abutting rubber is provided between facing surfaces of an outer circumference surface of the stopper support part and the inner circumference surface of the locking part, and a base end part of the locking part is elastically coupled to the stopper support part via the abutting rubber.

With the tubular vibration-damping device of this mode, when the locking part is elastically deformed to the inner circumference side, elasticity by the abutting rubber is applied to the base end part of the locking part so as to supplement the elasticity of the locking part. Also, by having elasticity by the abutting rubber given to the locking part, even in a state with the stopper rubber being swelling before abutment to the locking part, there is a more stable locking state of the locking projection to the opening end surface of the mounting hole or the like, and even without the member thickness of the locking part and thus the member thickness of the outer tube member being excessively large, it is possible to more effectively obtain pull-out resistance force of the outer tube member from the mounting hole by the locking action of the locking projection.

A fourth mode of the present invention provides the tubular vibration-damping device according to any of the first to third modes, wherein the stopper rubber fixed to an axially tip end surface of the stopper support part integrally includes a covering rubber layer expanding over an outer circumference surface of the stopper support part.

With the tubular vibration-damping device of this mode, the stopper rubber is extended to the outer circumference surface of the stopper support part and the covering rubber layer is integrally formed, so elastic deformation made to get into the recess of the stopper rubber during input of a load in the axial direction can be generated well while avoiding excessive concentration of stress or distortion. As a result, the durability of the stopper rubber is improved, and the bulging deformation of the stopper rubber to the outer circumference side can be even more efficiently generated, so the action for blocking unintended release of the locking state by abutting of the stopper rubber against the locking part can be more effectively exhibited.

This mode is preferably used combined with the third mode, and by so doing, the stopper rubber and the abutting rubber are consecutively connected via the covering rubber layer, and it is also possible to integrally form the entirety of the stopper rubber, the covering rubber layer, and the abutting rubber.

A fifth mode of the present invention provides the tubular vibration-damping device according to any of the first to fourth modes, wherein the outer tube member is made thicker to the inner circumference side at its first axial end side so as to form the stopper support part.

With the tubular vibration-damping device of this mode, by making the first axial end side of the outer tube member thicker to the inner circumference side than the other parts, within a limited outer diameter dimension setting range, it is possible to provide the locking part and the stopper support part while effectively ensuring the volume of the main rubber elastic body without making the thickness dimension of the outer tube member substantially larger.

Preferably, with the main rubber elastic body that couples the inner shaft member and the outer tube member, it is desirable to provide a lightening part that expands between the facing surfaces of the stopper support part and the inner shaft member and opens at the first axial end surface. By so doing, at the first axial end side for which the thickness dimension becomes smaller in the axis perpendicular direction due to the outer tube member being made thicker to the inner circumference side, having excessive concentration of stress and distortion on the main rubber elastic body is avoided, and it is possible to avoid markedly high spring increase and to improve the degree of freedom for tuning the spring characteristics.

A sixth mode of the present invention provides the tubular vibration-damping device according to any of the first to fifth modes, wherein the outer tube member further includes on its second axial end a flange part that expands to the outer circumference side, and another stopper rubber that projects axially outward from the flange part is provided.

With the tubular vibration-damping device of this mode, it is possible to realize, using a simple structure, stopper rubbers at both axial directions projecting respectively outward, and possible to mount the device while applying a pre-compression load in the axial direction via both of these stopper rubbers. As a result, it is possible to further improve the fall out resistance strength of the outer tube member from the mounting hole, and by applying the pre-compression load in the axial direction to the stopper rubber at the first axial end side, it is possible to give a designated amount of swelling and deformation in advance to the outer circumference side, and when inputting a load in the axial direction, it is possible to more quickly and reliably obtain the restriction against deformation of the locking part to the inner circumference side.

With the tubular vibration-damping device constituted according to the present invention, by skillfully using the bulging deformation of the stopper rubber to the outer circumference side when a load in the axial direction is applied in the fall out direction of the outer tube member, the deformation of the locking part to the inner circumference side is restricted. Therefore, the locking status of the locking projection to the opening end surface of the mounting hole or the like can be effectively maintained with a simple structure, and it is possible to stably hold the outer tube member in the mounted state.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Following, we will describe embodiments of the present invention while referring to the drawings.

Figure 1:
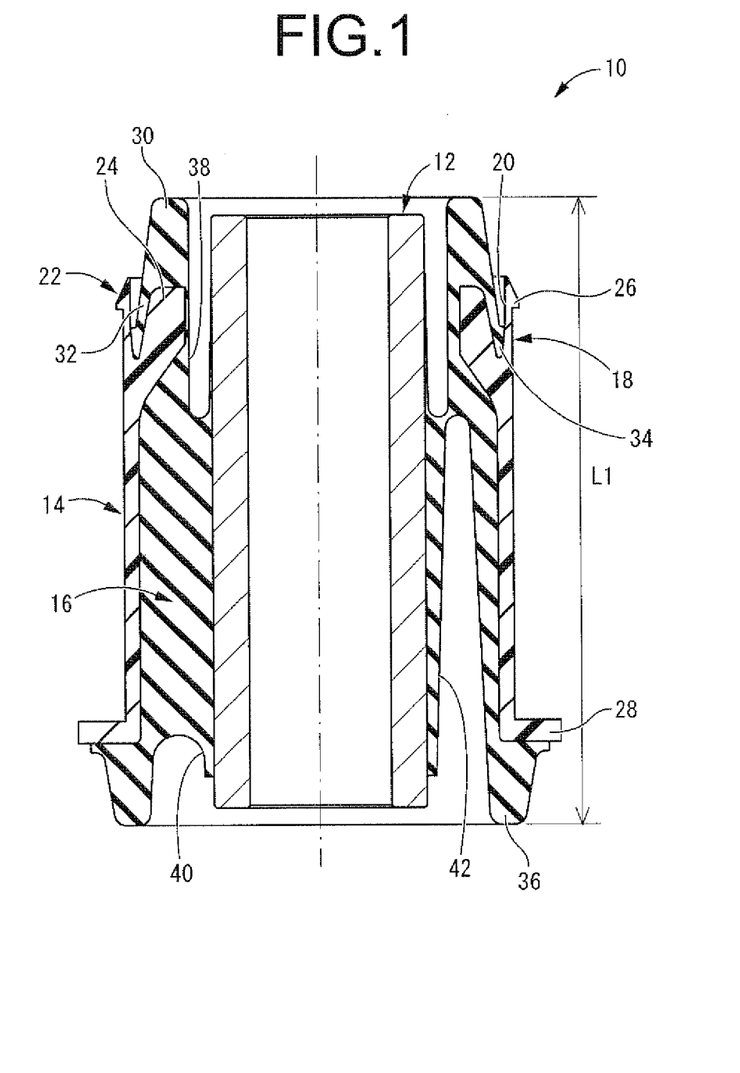
FIG. 1 is a vertical cross section view of a tubular vibration-damping device as a first embodiment of the present invention, taken along line 1-1 of FIG. 3.
Figure 2:
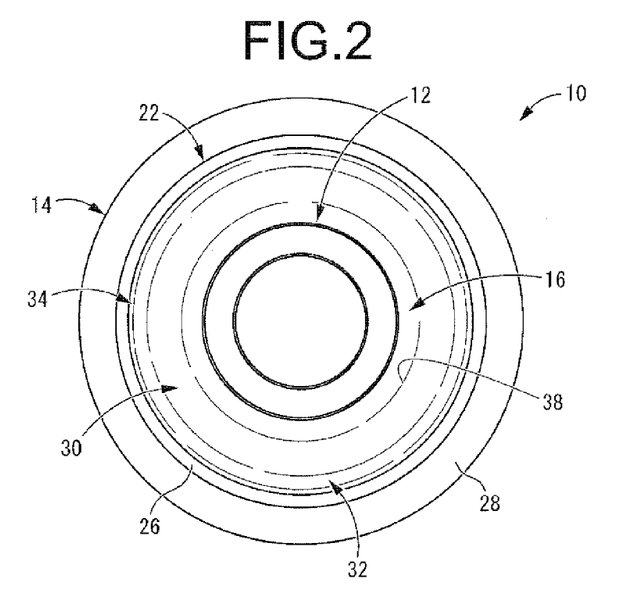
FIG. 2 is a plan view of the tubular vibration-damping device shown in FIG. 1.
Figure 3:
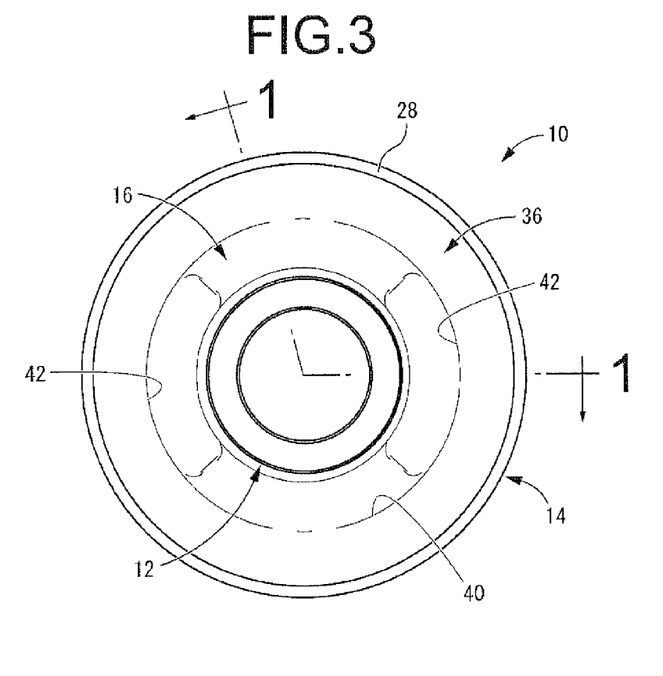
FIG. 3 is a bottom view of the tubular vibration-damping device shown in FIG. 1.

In FIGS. 1 to 3, as a first embodiment of the tubular vibration-damping device constituted according to the present invention, a suspension member mount 10 is shown. The suspension member mount 10 has a constitution for which an inner shaft member 12 is inserted into an outer tube member 14 while being separated by a designated distance, wherein the inner shaft member 12 and the outer tube member 14 are elastically coupled by a main rubber elastic body 16. With the description hereafter, as a rule, the vertical direction means the vertical direction in FIG. 1.

In more specific detail, the inner shaft member 12 is formed using a material such as metal, synthetic resin or the like, and exhibits a thick walled, small diameter roughly round cylinder shape.

The outer tube member 14 is made of a synthetic resin material that is fiber reinforced as necessary, and overall exhibits a thin walled, large diameter roughly round cylinder shape.

Also, the outer tube member 14 is fitted externally on the inner shaft member 12, the inner shaft member 12 and the outer tube member 14 are arranged separated by a designated distance in the axis perpendicular direction along the entire circumference, and the main rubber elastic body 16 is interposed between the inner shaft member 12 and the outer tube member 14. In particular, with this embodiment, the inner shaft member 12 and the outer tube member 14 are arranged coaxially on one mount center axis.

The main rubber elastic body 16 is a rubber elastic body having a thick walled roughly round cylinder shape, wherein the inner circumference surface is overlapped on and adhered to the outer circumference surface of the inner shaft member 12, and the outer circumference surface is overlapped on and adhered to the inner circumference surface of the outer tube member 14. By so doing, the inner shaft member 12 and the outer tube member 14 are elastically coupled in the axis perpendicular direction by the main rubber elastic body 16. The main rubber elastic body 16 can be formed as an integrally vulcanization molded component equipped with the inner shaft member 12 and the outer tube member 14.

Here, provided on the outer tube member 14, is a thick walled part 18 for which the inner diameter dimension has been made small at the upper end part which is the first axial end, specifically, which has been made thicker to the inner circumference side. At the inner circumference surface of the outer tube member 14, the connecting part of the outer tube member 14 and the thick walled part 18 have a tapered shape, and the inner diameter dimension of that connecting part changes smoothly.

Also, on the thick walled part 18, a recess 20 that opens at the axial end surface and extends axially inward of the thick walled part 18 is formed. This recess 20 is a groove shaped recess extending in roughly a fixed cross section shape across the entire circumference in the circumference direction. With this recess 20, on the axial top end part of the thick walled part 18, constituted are a thin walled tubular locking part 22 in the outer circumference side, and a thick walled round ring block shaped stopper support part 24 in the inner circumference side. Said another way, the locking part 22 is positioned at the outer circumference side of the stopper support part 24 across the recess 20 that opens axially outward of the outer tube member 14.

Also, the thickness dimension of this locking part 22 (the lateral direction dimension in FIG. 1) is slightly smaller than the thickness dimension of the middle part of the outer tube member 14, allowing for easy elastic deformation. A locking projection 26 is formed on the outer circumference surface of the top end part of the locking part 22. With this embodiment, this locking projection 26 is a hook shape projecting with a designated dimension on the outer circumference surface of the locking part 22, and the top end surface of the locking projection 26 is an inclined surface that is inclined to the inner circumference side going axially outward.

Also, while the stopper support part 24 of this embodiment is a tubular shape which extends in the axial direction with roughly the same inner diameter dimension of the inner circumference surface across the entire circumference, the outer circumference surface is an inclined surface that gradually expands to the outer circumference side from the tip end side to the base end side. Also, the locking part 22 projects slightly upward in the axial direction further than the axial end surface of the stopper support part 24.

On the other hand, at the bottom end part which is the second axial end of the outer tube member 14, a flange part 28 that expands to the outer circumference side in the axis perpendicular direction is formed. The separation distance in the axial direction between the lower end surface of the locking projection 26 and the flange part 28 is equal to the axial dimension for the mounting hole of a suspension member 44 described later.

Furthermore, an upper stopper rubber 30 is adhered to the top end surface of the stopper support part 24 of the outer tube member 14, and projects from the axial tip end surface of the stopper support part 24 facing axially outward. Said another way, the base end part of the upper stopper rubber 30 projecting axially outward is supported by the stopper support part 24. Also, this upper stopper rubber 30 projects to a position further to the axially outside than the axial top end surface of the inner shaft member 12. Furthermore, the upper stopper rubber 30 of this embodiment has a shape of thick walled round ring, wherein the inner diameter dimension is roughly fixed while the outer diameter dimension of the base end part is larger than that of the tip end surface of the stopper support part 24.

Also, with this embodiment, a thin walled covering rubber layer 32 is provided across the entire circumference of the outer circumference surface of the stopper support part 24, and is adhered as necessary. Furthermore, at the bottom part of the recess 20, an abutting rubber 34 is provided between the facing surfaces of the outer circumference surface of the stopper support part 24 and the inner circumference surface of the locking part 22, and this is adhered as necessary. By so doing, the base end part of the locking part 22 is elastically coupled to the stopper support part 24 via the abutting rubber 34. Even with only the locking part 22, curve deformation to the inner circumference side or restoring deformation to the outer circumference side is possible. However, by abutting or adhering this kind of abutting rubber 34 on the inner circumference surface of the locking part 22, this is even more effective since it is possible to use the elastic restoring force of the abutting rubber 34 when restoring to the outer circumference side of the locking part 22, for example. With this embodiment, the upper stopper rubber 30, the covering rubber layer 32, and the abutting rubber 34 are formed continuously and integrally. Furthermore, these rubbers and the main rubber elastic body 16 are connected through connection grooves formed at a plurality of locations at equal intervals on the circumference at the inner circumference surface of the stopper support part 24, and integrally formed.

Yet further, a lower stopper rubber 36 is formed as the other stopper rubber on the bottom surface of the flange part 28 of the outer tube member 14, while projecting facing axially outward from the flange part 28. This lower stopper rubber 36 projects further to the axially outside than the axial lower end surface of the inner shaft member 12, and is integrally formed with the main rubber elastic body 16. With this embodiment, this lower stopper rubber 36 has a thick walled, roughly round ring shape.

Furthermore, with this embodiment, an upper lightening part 38 extending axially inward from the axial top end surface of the main rubber elastic body 16 is formed around the periphery of the inner shaft member 12, and extends axially inward by a designated dimension. The outer circumference surface of this upper lightening part 38 is connected to the inner circumference surface of the upper stopper rubber 30 on the axial top part. Also, by the upper lightening part 38 being formed, higher spring in the axis perpendicular direction that comes with formation of the stopper support part 24 is avoided.

Also, a lower lightening part 40 that opens at the axial lower end surface is formed on the main rubber elastic body 16 of this embodiment. This lower lightening part 40 has a ring shaped recessed groove shape extending across the entire circumference in the circumference direction, and the outer circumference surface of the lower lightening part 40 is connected to the inner circumference surface of the lower stopper rubber 36 at the axial bottom part.

In particular, with this embodiment, in one radial direction of the lower lightening part 40 (lateral direction in FIG. 3), a pair of bore parts 42, 42 for which the depth dimension is made larger are formed and disposed in opposition, each having a size that is about ¼ of the circumference. With this pair of bore parts 42, 42, the spring ratio is larger in two directions of the axis perpendicular direction that are orthogonal to each other, and during vehicle mounting of the suspension member mount 10 described later, compared to the vehicle front-back direction (lateral direction in FIG. 3), the spring rigidity in the vehicle lateral direction (vertical direction in FIG. 3) can be set to be relatively hard.

Figure 4:
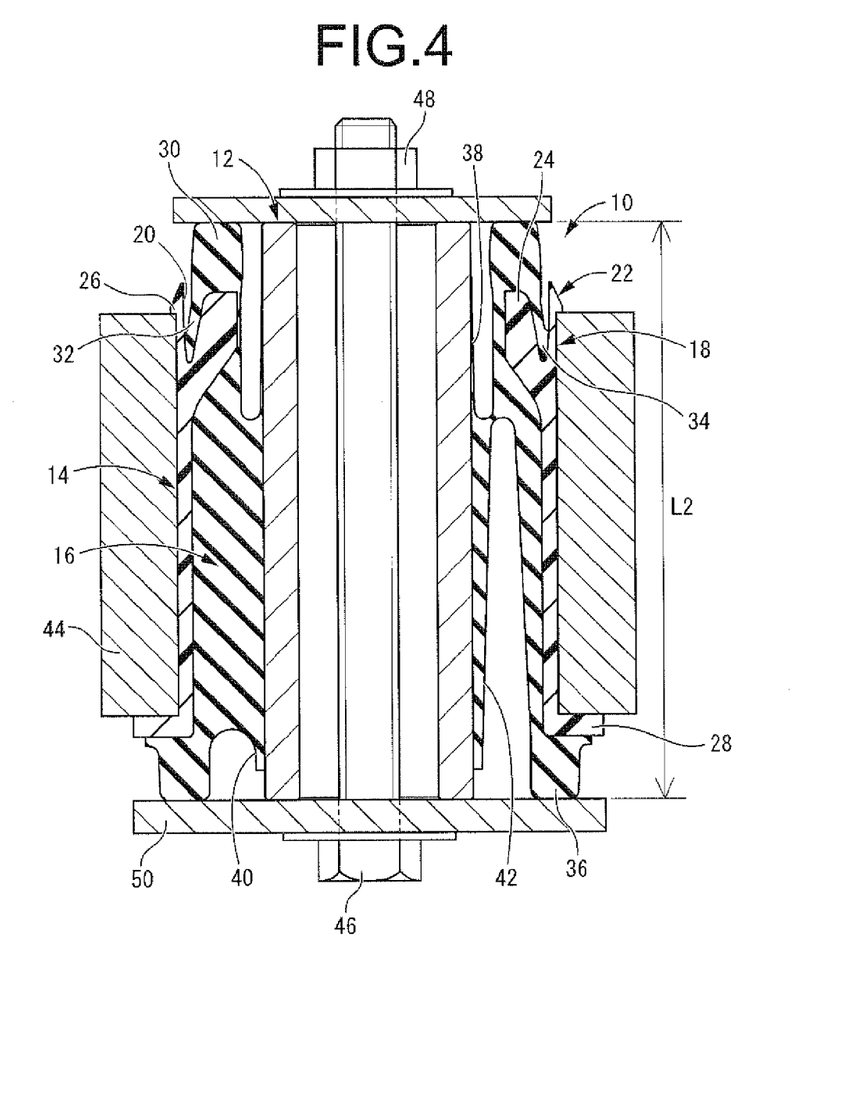
FIG. 4 is a vertical cross section view suitable for explaining the mounted state of the tubular vibration-damping device shown in FIG. 1.

Furthermore, FIG. 4 shows the state of the suspension member mount 10 constituted as described above mounted on a vehicle. Specifically, the outer tube member 14 is inserted in the mounting hole of the suspension member 44, and by having a fixing bolt 46 inserted through the inner hole of the inner shaft member 12 and fastened by a fixing nut 48, a vehicle body 50 and the inner shaft member 12 are fixed by a bolt. By so doing, the vehicle body 50 and the suspension member 44 are coupled in a vibration damping manner by the suspension member mount 10. The suspension member mount 10 is mounted so as to have the vertical direction in FIG. 4 be the vehicle vertical direction, to have the vertical direction in FIG. 3 be the vehicle lateral direction, and to have the lateral direction in FIG. 3 be the vehicle front-back direction, for example.

In more specific detail, when inserting the suspension member mount 10 from below the mounting hole of the suspension member 44, by the locking part 22 having curve deformation to the inner circumference side, the locking projection 26 is inserted in the axial direction in a sliding contact state with the inner circumference surface of the mounting hole. Also, when the insertion end is stipulated by the bottom end of the suspension member 44 abutting against the flange part 28, the locking projection 26 pulls out of the mounting hole upward, and the locking part 22 undergoes elastic restoration deformation to the outer circumference side. By so doing, the lower end surface of the locking projection 26 abuts against the top end surface of the suspension member 44, and the suspension member 44 is aligned and fixed in the axial direction between the locking projection 26 and the flange part 28.

The tip end surface of the locking part 22 has a tapered surface that has a gradually smaller diameter toward the axial tip end side from the outer circumference edge of the locking projection 26, and when inserting the suspension member 44 in the mounting hole, it is easily lead to and inserted in the mounting hole interior, and elastic deformation of the locking part 22 to the inner circumference side is generated smoothly. Also, to allow mounting of the suspension member mount 10, the inner diameter dimension of the mounting hole of the suspension member 44 is set to be roughly the same as the outer diameter dimension of the outer tube member 14. Naturally, the inner diameter dimension of the mounting hole is slightly smaller than the outer diameter dimension of the outer tube member 14, and it is possible to apply pre-compression of the shrinking diameter direction on the outer tube member 14 or the main rubber elastic body 16 in the mounted state, and using that pre-compression, it is possible to set the elastic restoring force of the locking part 22 to be even larger, so as to improve the locked state holding force of the locking projection 26 to the flange part 28.

Here, if the axial dimension from the top end surface of the upper stopper rubber 30 to the lower end surface of the lower stopper rubber 36 with the suspension member mount 10 in the standalone state shown in FIG. 1 is L1, and the same dimension in the vehicle mounted state shown in FIG. 4 is L2, then L2<L1. Specifically, in the standalone state, the upper stopper rubber 30 and the lower stopper rubber 36 extend further to the axially outside than the axial top end and bottom end of the inner shaft member 12, but by the suspension member mount 10 being mounted in the vehicle, the upper stopper rubber 30 and the lower stopper rubber 36 are compressed to the same position as both ends in the axial direction of the inner shaft member 12. By so doing, in the vehicle mounted state, a pre-compression load in the axial direction is applied to the suspension member mount 10, and the spring characteristics in the axial direction are adjusted.

With the suspension member mount 10 mounted in the vehicle in this way, a vibration damping effect is exhibited by the main rubber elastic body 16 and the upper and lower stopper rubbers 30 and 36 on the vibration of various directions applied between the inner shaft member 12 and the outer tube member 14. In particular, by the spring ratio being made larger in the vertical direction and lateral direction in FIG. 3 which are the vehicle lateral direction and vertical direction, it is possible to achieve both vehicle handling stability and riding comfort.

Also, when riding over a bump or the like during vehicle travel, when a large load in the direction for which the suspension member 44 projects upward in relation to the vehicle body 50 is input, the inner shaft member 12 is displaced axially downward relative to the outer tube member 14. At that time, the top end surface of the upper stopper rubber 30 is pressed by the vehicle body 50 adhered to the axial top end part of the inner shaft member 12. Thus, a large load by the vehicle body 50 is directly applied axially downward to the outer tube member 14 from the stopper support part 24 via the upper stopper rubber 30. Therefore, the large load input in the vehicle vertical direction is applied in a direction for which the outer tube member 14 is pulled out downward form the mounting hole of the suspension member 44.

Figure 5:
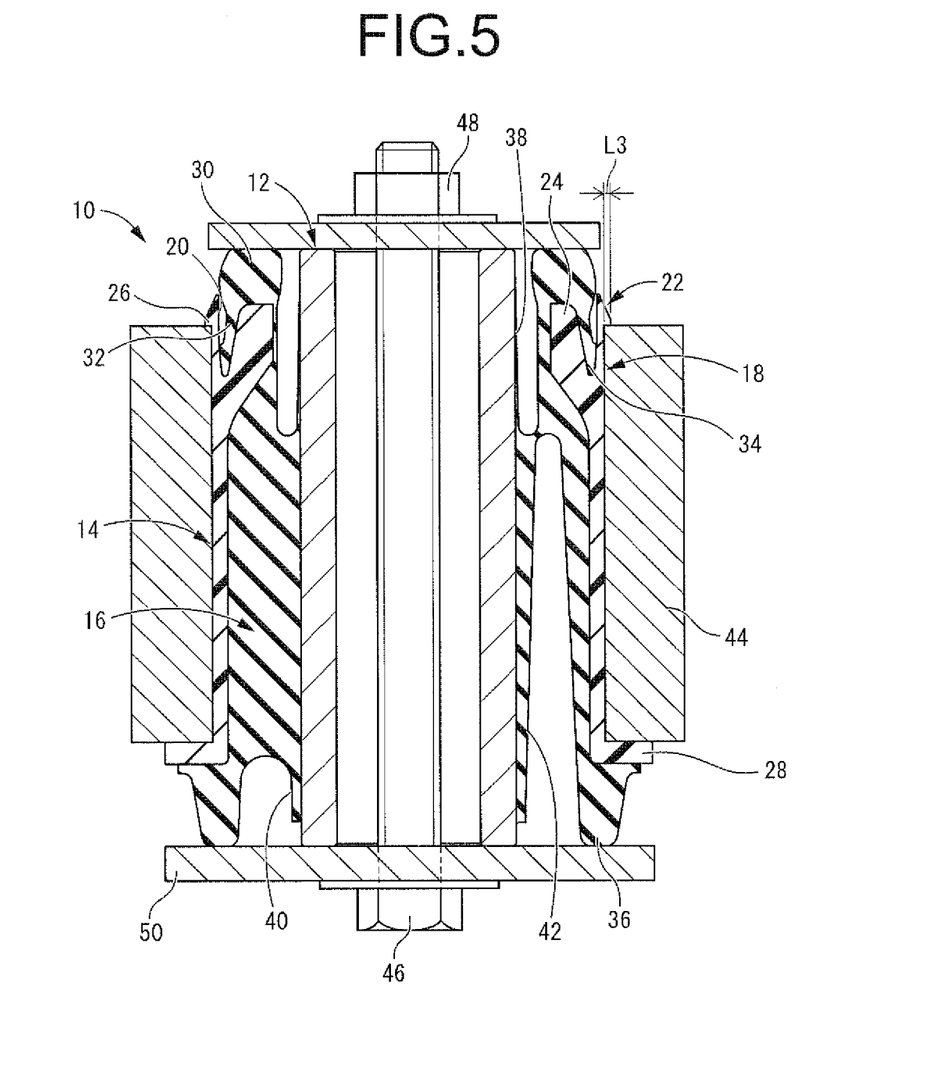
FIG. 5 is a vertical cross section view suitable for explaining the input state of a load in the axial direction with the tubular vibration-damping device shown in FIG. 4.

Here, as shown in FIG. 5, with the suspension member mount 10 as described above, the base end part of the upper stopper rubber 30 is supported by the stopper support part 24, so the upper stopper rubber 30 undergoes efficient compression deformation in the axial direction between the facing surfaces of the vehicle body 50 and the stopper support part 24. As a result, the upper stopper rubber 30 undergoes large and stable swelling deformation to the outer circumference side, and the swelling deformation part is displaced in the approaching direction to the inner circumference surface of the locking part 22. By so doing, the elastic deformation of the locking part 22 to the inner circumference side can be restricted by the locking part 22 abutting against the swelling deformation part of the upper stopper rubber 30.

In fact, since the recess 20 is formed between the locking part 22 and the stopper support part 24, the part that swells to the outer circumference side when the upper stopper rubber 30 undergoes compression deformation in the axial direction is elastically deformed in the direction of getting into the recess 20, and by a large generation of the swelling deformation part at the axial lower side part of the upper stopper rubber 30, abutting against the inner circumference surface of the locking part 22 positioned below can be advantageously exhibited.

In particular, with this embodiment, the outer circumference surface of the stopper support part 24 is an inclined surface, and as the upper stopper rubber 30 is elastically deformed and gets into the recess 20, based on the guiding action and component force action of this, the upper stopper rubber 30 more efficiently undergoes swelling deformation to the outer circumference side. In fact, with the upper stopper rubber 30 that is elastically deformed so as to get into the recess 20, there is greater deformation rigidity to the radial direction inward by the stopper support part 24, so resistance force in relation to the abutting reaction force to the locking part 22 can also be sufficiently ensured.

In addition, the outer diameter dimension of the base end part of the upper stopper rubber 30 is larger than the outer diameter dimension of the tip end surface of the stopper support part 24, so during compression deformation in the axial direction of the upper stopper rubber 30, elastic deformation in the direction of getting into the recess 20 at the outer circumference part of the upper stopper rubber 30, and thus swelling deformation of the upper stopper rubber 30 in the part opposite to the locking part 22 in the radial direction, can be more efficiently generated.

Furthermore, with this embodiment, in the standalone state before mounting of the suspension member mount 10, the top end surface of the stopper support part 24 that supports the upper stopper rubber 30 is set to be positioned further inward in the axial direction than the tip end part of the locking part 22. By so doing, the tip end part of the locking part 22 is positioned facing opposite in the radial direction to the upper stopper rubber 30 above the stopper support part 24, so when the upper stopper rubber 30 undergoes swelling deformation to the outer circumference side along with input of a load in the axial direction as described above, the swelling deformation part can be more efficiently abutted against the locking part 22.

Therefore, with the suspension member mount 10 of this embodiment, by skillfully using the compression deformation of the upper stopper rubber 30 to effectively prevent releasing of the locked state of the locking projection 26 to the circumference edge of the mounting hole of the suspension member 44 in accordance with elastic deformation to the inner circumference side of the locking part 22, the pull-out resistance force of the suspension member mount 10 from the suspension member 44 is improved, and even in a case when a large load in the axial direction is applied, for example, it is possible to stably keep an attached state of the outer tube member 14 to the mounting hole of the suspension member 44.

As is clear from the description above, it is acceptable as long as, by the upper stopper rubber 30 being compressively deformed in the axial direction and swelling to the outer circumference side, the swelling part of the outer circumference side abuts against the inner circumference surface of the locking part 22, whereby deformation to the inner circumference side of the locking part 22 is limited. For example, in the standalone state shown in FIG. 1 or the mounted state shown in FIG. 4, it is also acceptable to have a large gap between the facing surfaces of both items without having the upper stopper rubber 30 abut against the locking part 22. Also, even in a state with a load in the axial direction input and the upper stopper rubber 30 undergoing swelling deformation as shown in FIG. 5, it is acceptable to have a certain amount of gap left remaining between the facing surfaces of the upper stopper rubber 30 and the locking part 22 in the radial direction. Specifically, in a state for which the locking part 22 is elastically deformed to the inner circumference side by the amount of the projection height dimension L3 of the locking projection 26 (see FIG. 5) until the locked state is released, it acceptable as long as the swelling deformation part of the upper stopper rubber 30 is able to abut against the inner circumference surface of the locking part 22 and apply the deformation restriction effect on the locking part 22.

Above, we gave a detailed description of embodiments of the present invention, but the present invention is not limited to that specific description. For example, with the embodiments noted above, the main rubber elastic body 16, the upper stopper rubber 30, the covering rubber layer 32, and the abutting rubber 34 were integrally formed, but the invention is not limited to this mode, and these can be respectively formed as separate units. Naturally, with the present invention, the covering rubber layer 32 and the abutting rubber 34 are not absolutely essential. Specifically, when a load in the axial direction is input to the suspension member mount 10, it is possible to have only the upper stopper rubber 30 undergo swelling deformation and be put into the recess 20 to limit the curve deformation to the inner circumference side of the locking part 22.

Also, the size of the upper lightening part 38, the lower lightening part 40, and the bore part 42 is not limited to the shape of the aforementioned embodiments. For the sizes, it is possible to change the design as appropriate according to the required vibration-damping characteristics, and adjusting these sizes enables tuning for the required vibration-damping characteristics. Naturally, these are not absolutely essential for the present invention.

Furthermore, with the embodiments noted above, the locking part 22 and the stopper support part 24 are formed across the entire circumference in the circumference direction, but the invention is not limited to this mode. Specifically, the locking part and the stopper support part can also be respectively formed on a plurality of locations on the circumference. Alternatively, one can be formed across the entire circumference on the circumference while the other can be formed at a plurality of locations on the circumference or the like. Also, when the locking parts are formed at a plurality of locations on the circumference, it is possible to form them by providing slits extending in the axial direction from the axial end surface of the outer tube member 14 on both end parts in the circumference direction of the locking part, and it is possible to adjust the size of this slit to adjust the deformation characteristics of the locking part.

Yet further, with this embodiment, at the axial bottom end part of the outer tube member 14, the flange part 28 is formed across the entire circumference of the circumference direction, but for example it can be formed partially at a plurality of locations on the circumference. Naturally, the flange part 28 is not absolutely necessary for the present invention. Therefore, for example, even in a case when it is necessary to stipulate the position in the axial direction of the outer tube member in relation to the mounting hole of the suspension member, it is also possible to use the same locking structure as the axial top end part for the axial bottom end part of the outer tube member.

Also, with the embodiments noted above, a hook shaped locking projection 26 was used, but as noted in JP-U-5-077637 described above, it is also possible to use a locking projection having a mountain shaped cross section or the like, and the shape of the locking projection can be changed as appropriate according to the shape of the suspension member which is fitted externally on the outer tube member.

Furthermore, the present invention can be used not only for various types of tubular vibration-damping devices for which the mount center axis is arranged along roughly the vertical direction as described by example, but can also be used for a bush or the like for which the mount center axis is arranged along roughly the horizontal direction or the like. Particularly, it is suitable for a vibration-damping device wherein an input load in the axial direction is applied in the direction for which the outer tube member falls out from the mounting hole.

What is claimed is:

1. A tubular vibration-damping device comprising:
an inner shaft member;
an outer tube member; and
a main rubber elastic body coupling the inner shaft member and the outer tube member, wherein
the outer tube member is made of synthetic resin,
the outer tube member integrally includes on its first axial end a locking part having a locking projection on its outer circumference surface and a stopper support part that supports a base end part of a stopper rubber projecting axially outward therefrom,
the locking part is positioned at an outer circumference side of the stopper support part across a recess that opens axially outward of the outer tube member, and
deformation of the locking part to an inner circumference side is restricted by the stopper rubber swelling to the outer circumference side along with its compressive deformation in an axial direction and abutting against an inner circumference surface of the locking part.

2. The tubular vibration-damping device according to claim 1, wherein an outer circumference surface of the stopper support part is an inclined surface gradually expanding to the outer circumference side from a tip end side to a base end side in the axial direction.

3. The tubular vibration-damping device according to claim 1, wherein at a bottom part of the recess, an abutting rubber is provided between facing surfaces of an outer circumference surface of the stopper support part and the inner circumference surface of the locking part, and a base end part of the locking part is elastically coupled to the stopper support part via the abutting rubber.

4. The tubular vibration-damping device according to claim 1, wherein the stopper rubber fixed to an axially tip end surface of the stopper support part integrally includes a covering rubber layer expanding over an outer circumference surface of the stopper support part.

5. The tubular vibration-damping device according to claim 1, wherein the outer tube member is made thicker to the inner circumference side at its first axial end side so as to form the stopper support part.

6. The tubular vibration-damping device according to claim 1, wherein the outer tube member further includes on its second axial end a flange part that expands to the outer circumference side, and another stopper rubber that projects axially outward from the flange part is provided.

* * * * *